(12) United States Patent
Hsu

(10) Patent No.: US 8,608,423 B2
(45) Date of Patent: Dec. 17, 2013

(54) DEVICE FOR CLAMPING AND ROTATING THE OBJECT

(75) Inventor: Huang-Pin Hsu, Taoyuan (TW)

(73) Assignee: Chan Li Machinery Co., Ltd., Taoyuan (TW)

( * ) Notice: Subject to any disclaimer, the term of this patent is extended or adjusted under 35 U.S.C. 154(b) by 182 days.

(21) Appl. No.: 13/231,212

(22) Filed: Sep. 13, 2011

(65) Prior Publication Data

US 2012/0163952 A1 Jun. 28, 2012

(30) Foreign Application Priority Data

Dec. 24, 2010 (TW) ................................ 99145775 A (51) Int. Cl.
*G01N 21/95* (2006.01)

(52) U.S. Cl.
USPC ............ 414/763; 414/764; 414/771; 414/783

(58) Field of Classification Search
USPC ....................... 198/403; 294/119.1, 34, 86.41; 414/419, 746.3, 746.8, 758, 763, 764, 414/766, 771, 783; 901/31
See application file for complete search history.

(56) References Cited

U.S. PATENT DOCUMENTS

| | | | | |
|---|---|---|---|---|
| 2,772,766 A | * | 12/1956 | Kellam | 198/379 |
| 2,838,184 A | * | 6/1958 | MacCurdy | 414/766 |
| 3,106,301 A | * | 10/1963 | Jeddeloh | 414/758 |
| 3,184,079 A | * | 5/1965 | Dario | 414/765 |
| 3,215,286 A | * | 11/1965 | Frederick | 414/758 |
| 3,547,279 A | * | 12/1970 | Radomski | 414/765 |
| 3,710,955 A | * | 1/1973 | Redman et al. | 414/765 |
| 4,013,177 A | * | 3/1977 | Kinnicutt et al. | 414/767 |
| 4,735,452 A | * | 4/1988 | Nemoto | 294/119.1 |
| 7,284,946 B2 | * | 10/2007 | O'Neil | 414/763 |
| 2002/0171190 A1 | | 11/2002 | Gortner | |
| 2004/0051328 A1 | * | 3/2004 | Cinotti et al. | 294/119.1 |

FOREIGN PATENT DOCUMENTS

| | | |
|---|---|---|
| CN | 200991868 | 12/2007 |
| DE | 19613416 | 11/1996 |
| GB | 2435961 | 9/2007 |
| JP | 62-016961 | 1/1987 |
| JP | 02-169410 | 6/1990 |
| JP | 07-251921 | 3/1995 |
| TW | 526867 | 4/2003 |
| TW | M247359 | 10/2004 |
| TW | M373508 | 2/2010 |

* cited by examiner

Primary Examiner — Gregory Adams
(74) Attorney, Agent, or Firm — Muncy, Geissler, Olds & Lowe, PLLC (57) ABSTRACT

A device, used for clamping and rotating the object, includes two first rods, one ends of which are respectively connected to one ends of the first plate and the second plate through a linked unit; another ends of the first rods are connected to the third rod that is used for balancing the rotating angles of the first rod and two linked units, such that the heights of two ends of the first rods and the second rods can be kept in step. Two second rods are connected to the first plate and the second plate respectively, as well as, another ends of second rods are connected to the fourth rod respectively. Accordingly, the fourth rod can be rotated to drive the second rod, such that the first plate and the second plate can be rotated. Therefore, due to two plates are used for clamping and rotating synchronously, users can take the advantages while the device is used.

9 Claims, 6 Drawing Sheets

DEVICE FOR CLAMPING AND ROTATING THE OBJECT

BACKGROUND OF THE INVENTION

1. Technical Field

The present invention relates to a device for clamping and rotating the object, comprising two plates to be opened and closed or rotated over synchronously.

2. Description of the Prior Art

Figure 1:
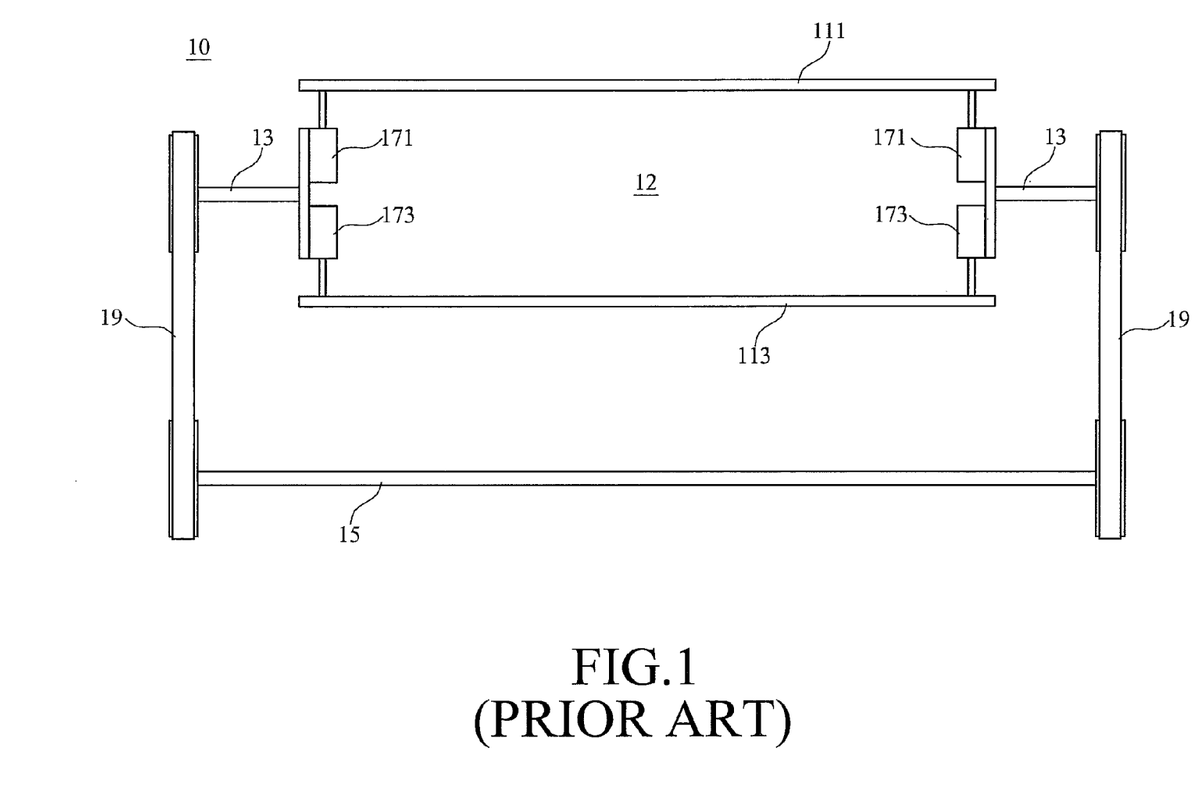
FIG. 1 is a schematic structural view of a device for clamping and rotating the object, according to the prior art.

FIG. 1 illustrates a device for clamping and rotating the object according to the prior art. As illustrated, the device 10 comprises a first plate 111, a second plate 113, two first rods 13, and a second rod 15. The first plate 111 is positioned oppositely with the second plate 113, and a clamping space 12 is provided between the first plate 111 and the second plate 113.

Two first rods 13 are provided on two ends of the first plate 111 and the second plate 113 respectively, that is, one ends of the first rods 13 are respectively connected to the first plate 111 and the second plate 113 through the first cylinder 171 and second cylinder 173. Accordingly, the first plate 111 and the second plate 113 can be drove to displace up and down for adjusting the size of clamping space 12 by the first cylinder 171 and the second cylinder 173, such that the object can be clamped between the first plate 111 and the second plate 113.

Besides, another end of the first rod 13 is connected to two ends of a second rod 15 through a transmission belt 19, accordingly, the first plate 111 and the second plate 113 can be drove to rotate by the first rod 13 since the second rod 15 is rotated. In other words, the first plate 111 and the second plate 113 of the device 10 can be used for clamping and rotating the object.

However, during the device 10 is clamping and rotating the object, the cylinders 171 and 173 thereof may telescoped asynchronously; therefore, as two first cylinders 171 telescope asynchronously, two ends of the first plate 111 will be with different heights; similarly, as two second cylinders 173 telescope asynchronously, two ends of the second plate 113 will be with different heights. Accordingly, it is inconvenient for use.

Moreover, the first plate 111 may be damaged due to the left first cylinder 171 and the right first cylinder 171 are telescoped asynchronously, that is, the left first cylinder 171 is telescoped faster than the right first cylinder 171, similarly, the second plate 113 may be damaged due to the left second cylinder 173 and the right second cylinder 173 are telescoped asynchronously.

The gravity also affects the first cylinder 171 and the second cylinder 173 to telescope asynchronously through the first plate 111 and the second plate 113 during the operation process; for example, when the first plate 111 is positioned upper than the first cylinder 171, the first cylinder 171 will bear the weight of the first plate 111, such that the first cylinder 171 will extend slower and retract faster; comparatively, when the second plate 113 is positioned lower than the second cylinder 173, the second cylinder 173 will bear the weight of the second plate 113, such that the second cylinder 173 will extend faster and retract slower. Therefore, the device 10 will be inconvenient for use due to the first plate 111 and the second plate 113 are displaced asynchronously.

SUMMARY OF THE PRESENT INVENTION

It is, therefore, the main object of the present invention to provide a device for clamping and rotating the object, which comprises two linked units connected with two ends of the first plate and the second plate, the first plate and the second plate being drove by two linked units simultaneously to be displaced up and down synchronously.

It is another object of the present invention to provide a device for clamping and rotating the object, wherein one ends of two first rods are respectively connected to two rotating units, and another ends thereof are respectively connected to a third rod for balancing the rotating angles of two first rods and two rotating units, such that the heights of the first plate and the second plate are kept to be equal.

It is still another object of the present invention to provide a device for clamping and rotating the object, wherein the linked unit comprises a rotating unit and two connecting units, and the rotating unit is connected respectively to the first plate and the second plate through two connecting units. The first plate and the second plate are drove by the rotating units through the connecting units, such that the first plate and the second plate can be displaced up and down synchronously.

It is still another object of the present invention to provide a device for clamping and rotating the object, wherein one ends of two second rods are respectively connected to the first plate and the second plate through the slides, and the first plate and the second plate can be slid along the slides. Another ends of two second rods are connected to a fourth rod, and the first plate and the second plate can be rotated by the fourth rod through the second rod.

It is still another object of the present invention to provide a device for clamping and rotating the object, wherein the second rod is connected to the rotating unit through the cylinder, the rotating unit is rotated by the cylinder to alter the size of the clamping space between the first plate and the second plate for benefiting to clamp the object positioned between the first plate and the second plate.

It is still another object of the present invention to provide a device for clamping and rotating the object, wherein the first rod is positioned within a through hole of the second rod, and the third rod is positioned within a through hole of the fourth rod, such that the first rod and the second rod can be rotated independently, and the third rod and the fourth rod can be rotated independently, besides, the volume of the device can be reduced.

To achieve these and other objects of the present invention, a device for clamping and rotating the object comprises a first plate, a second plate, two linked units, two first rods, two second rods, a third rod, and a fourth rod. The second plate is placed in the opposite position of the first plate, wherein a clamping space is provided between the first plate and the second plate. Each of two linked units comprises a rotating unit and two connecting units, wherein the rotating unit is connected to the first plate and the second plate through connecting units. Two first rods are respectively connected to two rotating units for driving the rotating unit to rotate. Two second rods are respectively connected to two rotating units for driving the first plate and the second plate to rotate through the rotating unit. The third rod is connected to two first rods. The fourth rod is connected to two second rods.

In one embodiment of aforesaid device for clamping and rotating the object, wherein the second rod is connected to the rotating unit through a cylinder, which is used for driving the rotating unit to rotate.

In one embodiment of aforesaid device for clamping and rotating the object, wherein two the first rods are connected to the third rod through a first linked unit respectively, and two the second rods are connected to the fourth rod through a second linked unit respectively.

In one embodiment of aforesaid device for clamping and rotating the object, wherein the third rod is passed through a through hole provided within the fourth rod.

In one embodiment of aforesaid device for clamping and rotating the object, wherein two the first rods are connected to the rotation axles of two the rotating units respectively.

To achieve these and other objects of the present invention, a device for clamping and rotating the object comprises a first plate, a second plate, two linked units, two first rods, two second rods, a third rod, and a fourth rod. The second plate is placed in the opposite position of the first plate, wherein a clamping space is provided between the first plate and the second plate. Each of two linked units comprises a rotating unit and two connecting units, wherein the rotating unit is connected to the first plate and the second plate through the connecting units. Two first rods are respectively connected to two rotating units for driving the rotating unit to rotate. Two second rods are respectively connected to the first plate and the second plate for driving the first plate and the second plate to rotate. The third rod is connected to two first rods. The fourth rod is connected to two second rods.

In one embodiment of aforesaid device for clamping and rotating the object, wherein each of the second rods is connected to the first plate and second plate through at least one slide.

In one embodiment of aforesaid device for clamping and rotating the object, wherein a sliding seat is provided on each end of the first plate and second plate, wherein the first plate and second plate are connected to the slides through the sliding seats.

In one embodiment of aforesaid device for clamping and rotating the object, wherein the third rod is passed through a through hole provided within the fourth rod.

In one embodiment of aforesaid device for clamping and rotating the object, wherein two the first rods are connected to the third rod through a first linked unit respectively, and two the second rods are connected to the fourth rod through a second linked unit respectively.

In one embodiment of aforesaid device for clamping and rotating the object, wherein two the first rods are connected to the rotation axles of each of two the rotating units respectively.

In one embodiment of aforesaid device for clamping and rotating the object, further comprising at least one cylinder used for driving the first rods or the rotating units to rotate.

DETAILED DESCRIPTION OF THE PREFERRED EMBODIMENTS

Figure 2:
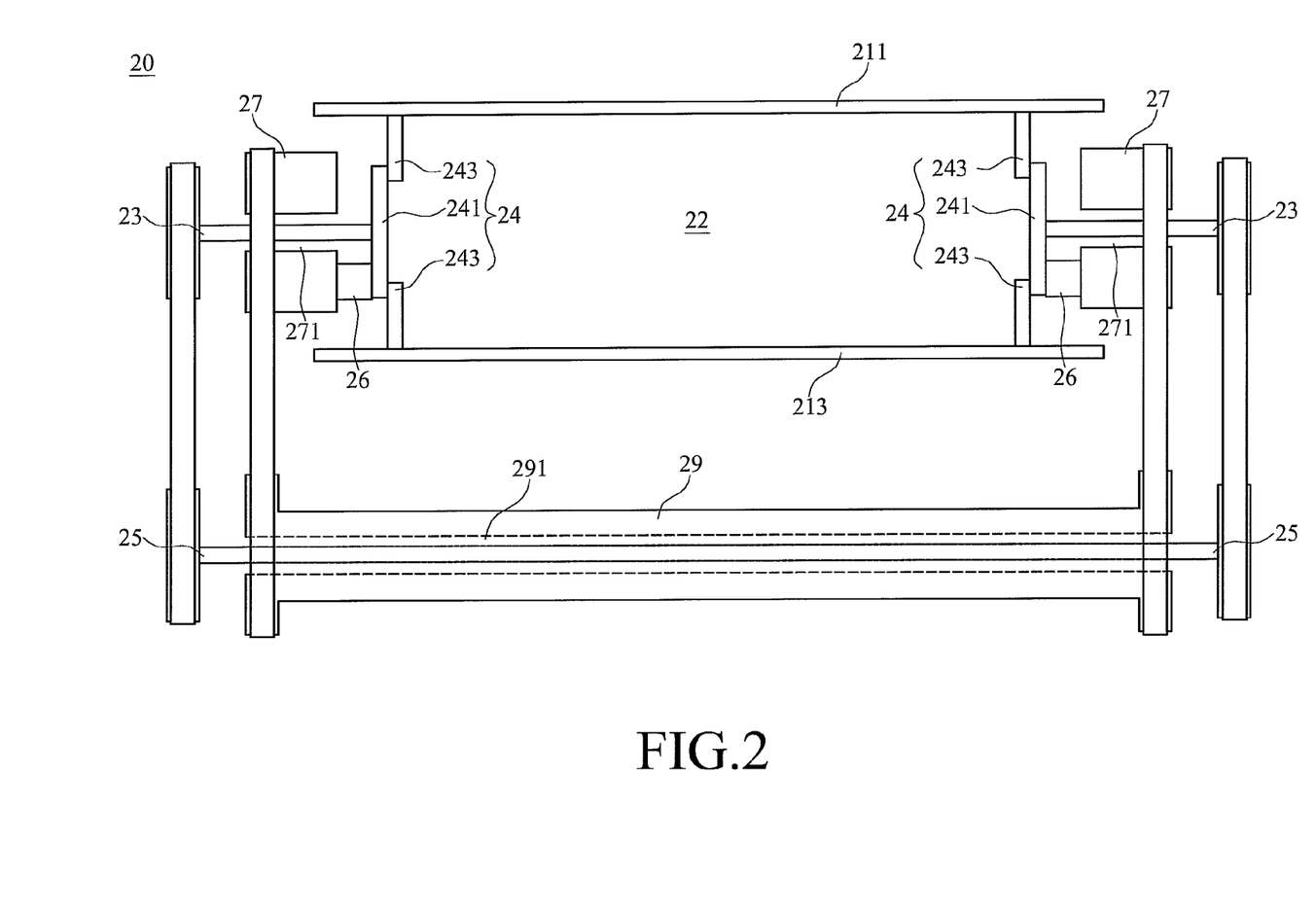
FIG. 2 is a schematic structural view of a device for clamping and rotating the object, in accordance with a first embodiment of the present invention.

Please refer to FIG. 2, a device for clamping and rotating the object in accordance with a first embodiment of the present invention is shown. The device 20 comprises a first plate 211, a second plate 213, two first rods 23, two linked units 24, two second rods 27, a third rod 25, and a fourth rod 29. The first plate 211 is placed in the opposite position of the second plate 213, and a clamping space 22 is provided between the first plate 211 and the second plate 213. The object, such as the stacked web products, can be placed in the clamping space 22, for being clamped and rotated through the first plate 211 and the second plate 213.

Two linked units 24 respectively comprise a rotating unit 241 and two connecting units 243, wherein the rotating unit 241 is connected to the first plate 211 and the second plate 213 respectively through two connecting units 243. The rotating unit 241 rotates to drive the first plate 211 and the second plate 213 through two connecting units 243, such that the first plate 211 and the second plate 213 can be displaced up and down synchronously.

Figure 3A:
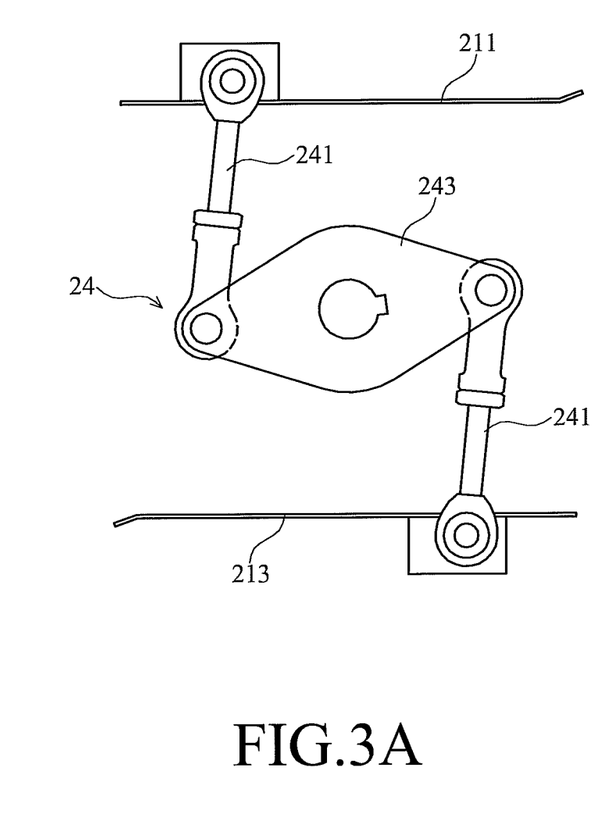
FIGS. 3A and 3B are schematic sectional views of different parts of the device for clamping and rotating the object in accordance with the first embodiment of the present invention.

Referring to FIG. 3A, the first plate 211 and the second plate 213 are displaced up and down synchronously for enlarging the clamping space 22 between the first plate 211 and the second plate 213 when the rotating unit 241 is rotated with small angle on clockwise direction. On the contrary, the first plate 211 and the second plate 213 are displaced down and up synchronously for reducing the clamping space 22 between the first plate 211 and the second plate 213 when the rotating unit 241 is rotated with small angle on counterclockwise direction. In actual practice, the rotating unit 241 can be as a gear, and the connecting unit 243 comprises the corresponding dentate structure 2433, such that two connecting units 243 can be drove to alter the size of clamping space 22 between the first plate 211 and the second plate 213 when the gear 241 is rotated, as shown on FIG. 3B.

Figure 3B:
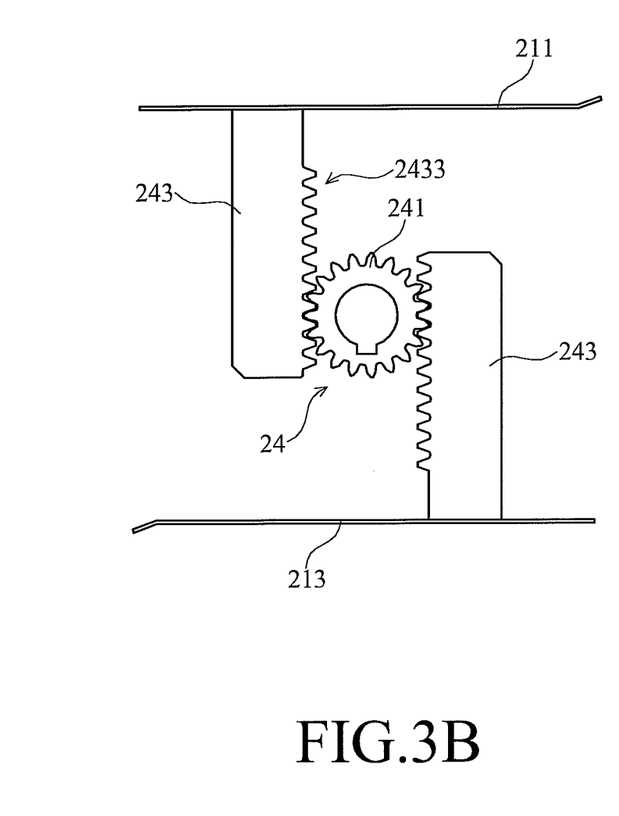

The first plate 211 and the second plate 213 are connected with the rotating unit 241 through the connecting units 243 and displaced synchronously when the rotating unit 241 is rotated. Besides, the linked unit 24 can be used for balancing the displacement rate between the first plate 211 and the second plate 213, for example, when the second plate 213 positioned in the lower place is affected by the gravity, the gravity of second plate 213 will be transferred to the first plate 211 through the connecting unit 243 and rotating unit 241, such that the difference of displacement rate between the first plate 211 and the second plate 213 can be got over due to the gravity effect.

One ends of two first rods 23 are respectively connected to two rotating units 241. For example, the first rod 23 is connected to the rotation axle of rotating unit 241, and the rotating unit 241 is drove to rotate for adjusting the spacing between the first plate 211 and the second plate 213 when the first rod 23 is rotated. Another ends of two first rods 23 are respectively connected to the third rod 25, wherein the third rod 25 can be used for balancing the rotating angle of two first rods 23 and two rotating units 241. For example, the right first rod 23 is drove to rotate when the left first rod 23 is rotated through the third rod 25; one the contrary, the left first rod 23 is drove to rotate when the right first rod is rotated through the third rod 25. In this embodiment, the first rod 23 is connected to the third rod 25 through the transmission belt, the chain, or the gear, and so on; accordingly, the third rod 25 can be used for balancing the rotating angles of two first rods 23 and two rotating units 241, such that the height of two ends of the first plate 211 and the second plate 213 can be equal.

One ends of two second rods 27 are respectively connected to two rotating units 241, first plate 211, and/or second plate 213. The first plate 211 and the second plate 213 are drove to rotate by the rotating units 241. In this embodiment, two second rods 27 are connected to the rotating units 241 through a cylinder 26 respectively for driving the rotating units 241 to rotate, such that the size of clamping space 22 between the first plate 211 and the second plate 213 can be altered. Besides, the first plate 211 and the second plate 213 can be drove to rotate by the second rods 27 through the cylinders 26 and linked units 24. Certainly, the second rods 27 can be connected to the rotating units 241 respectively through two cylinders 26, wherein two cylinders 26 are provided on two ends of the rotation axles of rotating units 241.

Another ends of two second rods 27 are respectively connected to the fourth rod 29. For example, the second rods 27 can be connected to the fourth rod 29 through the transmission belt, the chain, or the gear, and so on; accordingly, when the fourth rod 29 is rotated, two second rods 27 will be drove to rotate, furthermore, the first plate 211 and the second plate 213 will be drove to rotate by the second rods 27 through the cylinder 26 and linked unit 24.

In this embodiment, the second rods 27 further comprise a through hole 271 respectively, such that the first rods 23 can respectively pass through the through holes 271; furthermore, the diameters of first rods 23 are smaller than the through holes 271; therefore, the first rods 23 can be rotated within the through holes 271; for example, the first rods 23 and the second rods 27 are with the same rotation axles. As well as, the fourth rod 29 can be with a through hole 291, such that the third rod 25 can pass through the through hole 291, wherein the diameter of third rod 25 is also smaller than the through hole 291, therefore, the third rod 25 can be rotated within the through hole 291; for example, the third rod 25 and the fourth rod 29 are with the same rotation axles.

Figure 4:
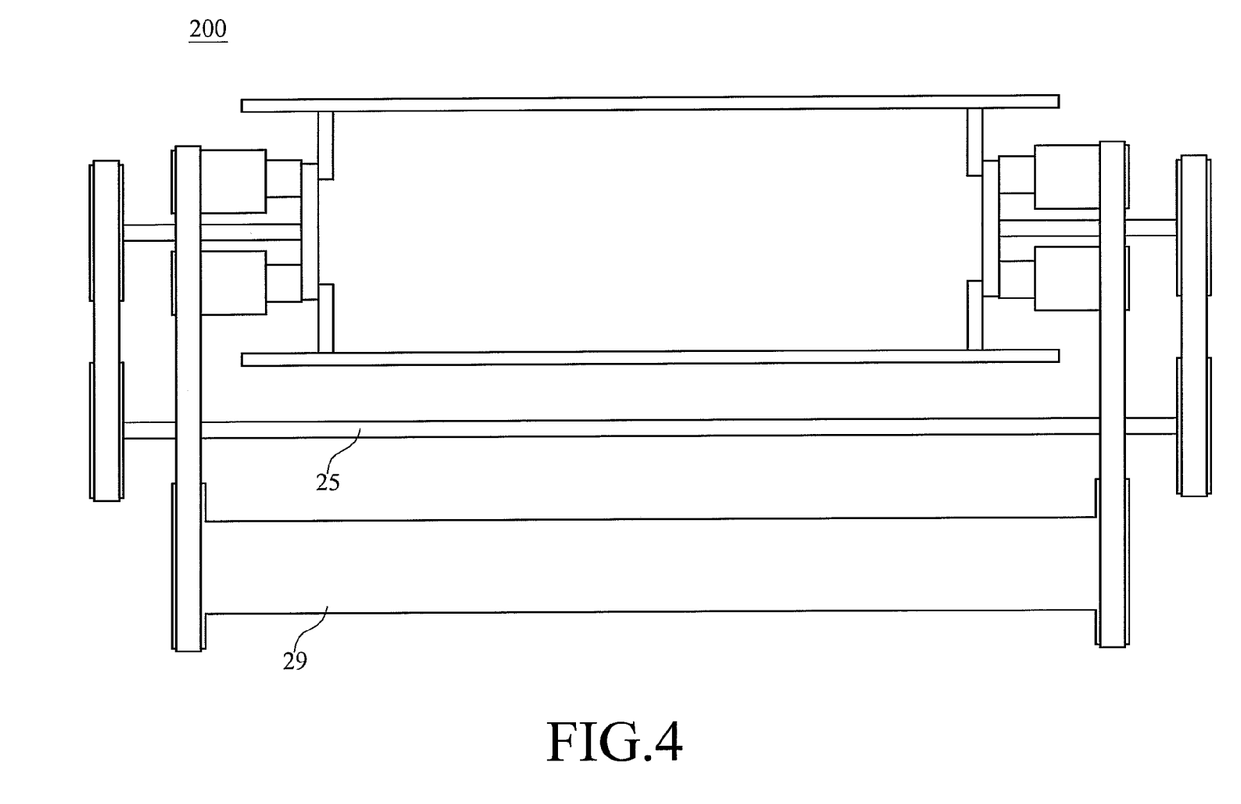
FIG. 4 is a schematic structural view of a device for clamping and rotating the object, in accordance with a second embodiment of the present invention.

Certainly, the fourth rod 29 can be provided out of the third rod 25 in other embodiment, as shown on FIG. 4, wherein the device 200 and the device 20 are with the same functions also.

Figure 5:
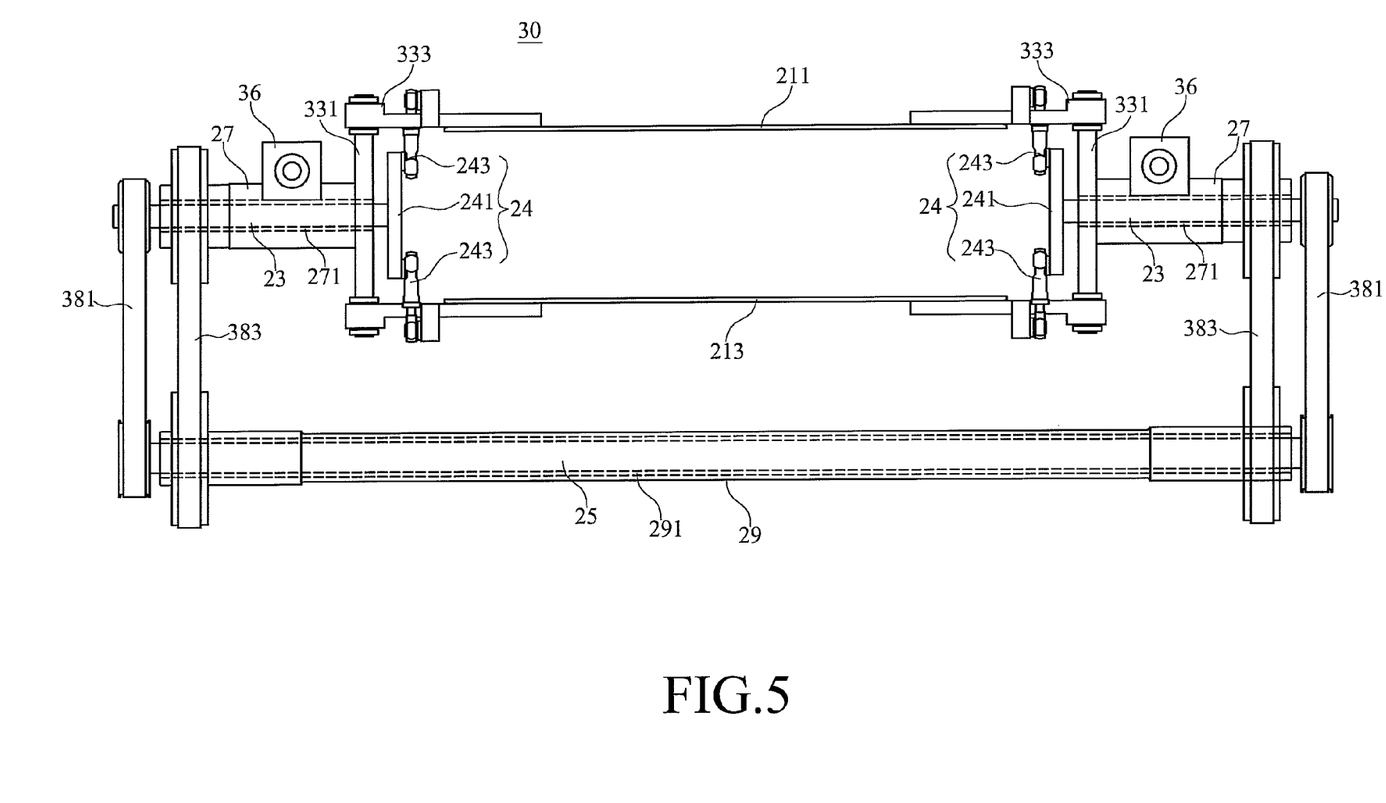
FIG. 5 is a schematic structural view of a device for clamping and rotating the object, in accordance with a third embodiment of the present invention.

Referring to FIG. 5, a device for clamping and rotating the object in accordance with a third embodiment of the present invention is shown. The device 30 comprises a first plate 211, a second plate 213, two first rods 23, two linked units 24, two second rods 27, a third rod 25, and a fourth rod 29.

The first rods 23 are connected to the first plate 211 and the second plate 213 respectively through the linked units 24, wherein each of the linked units 24 comprises a rotating unit 241 and two connecting units 243. The first rods 23 are connected to the rotating units 241, and the rotating units 241 are respectively connected to the first plate 211 and the second plate 213 through two connecting units 243. The first plate 211 and the second plate 213 are drove to displace up and down for altering the size of clamping space 22 between the first plate 211 and the second plate 213 by the rotating units 241 through the connecting units 243, wherein the rotating units 241 are drove to rotate by the first rods 23; therefore, the object, such as the stacked web products, positioned between the first plate 211 and the second plate 213, can be clamped accordingly.

In this embodiment, the device 30 comprises at least one cylinder 36, wherein the cylinder 36 can be used to drive the first rods 23 and/or the rotating units 241 to rotate with a small angle for adjusting the size of clamping space 22. Two first rods 23 are respectively connected to the third rod 25 through a first linked unit 381, wherein the first linked unit 381 can be as a gear, a transmission belt, or a chain, and so on. In other embodiment, the first rods 23 can be directly connected to the third rods 25.

Two first rods 23 are respectively connected to the third rod 25 through the first linked unit 381; accordingly, when one of the first rod 23 is rotated, another one of the first rod 23 will be drove to rotate through the first linked unit 381 and the third rod 25, such that two first rods 23 and two rotating units 241 will be with the same rotating angles, and the heights of two ends of the first plate 211 and the second plate 213 will be equal.

Two second rods 27 are respectively connected to the first plate 211 and the second plate 213, and used to drive to rotate the first plate 211 and the second plate 213; for example, two second rods 27 can be respectively connected to the first plate 211 and the second plate 213 through a slide 331; furthermore, the first plate 211 and the second plate 213 can be displaced along the slide 331. In this embodiment, two ends of the first plate 211 and the second plate 213 are respectively with a sliding seat 333 provided; therefore, the first plate 211 and the second plate 213 can be connected with the sliding seats 333 through the slides 331, such that the first plate 211 and the second plate 213 can be drove to displace along the slides 331 when the first rods 23 and/or the rotating units 241 are rotated.

The second rods 27 are rotated to drive the slides 331 and/or sliding seats 333 to rotate, such that the first plate 211 and the second plate 213 can be rotated accordingly, and the object, such as the stacked web products, positioned between the first plate 211 and the second plate 213, can be rotated as well. Two second rods 27 are respectively connected to the fourth rod 29 through a second linked unit 383, wherein the second linked unit 383 can be as a gear, a transmission belt, or a chain, and so on. In other embodiment, the second rods 27 can be directly connected to the fourth rod 29. Therefore, the fourth rod 29 can be rotated to drive the second rods 27 to rotate, and the first plate 211 and the second plate 213 can be rotated accordingly.

In this embodiment, the second rods 27 comprise through holes 271 respectively, and the first rods 23 are provided within the through holes 271, such that the first rods 23 can be rotated within the through holes 271. The fourth rod 29 comprises a through hole 291, and the third rod 25 is provided within the through hole 291, such that the third rod 25 can be rotated within the through hole 291. Accordingly, the volume of the device 30 can be efficiently reduced due to the foresaid embodiment, as shown on FIG. 5.

Figure 6:
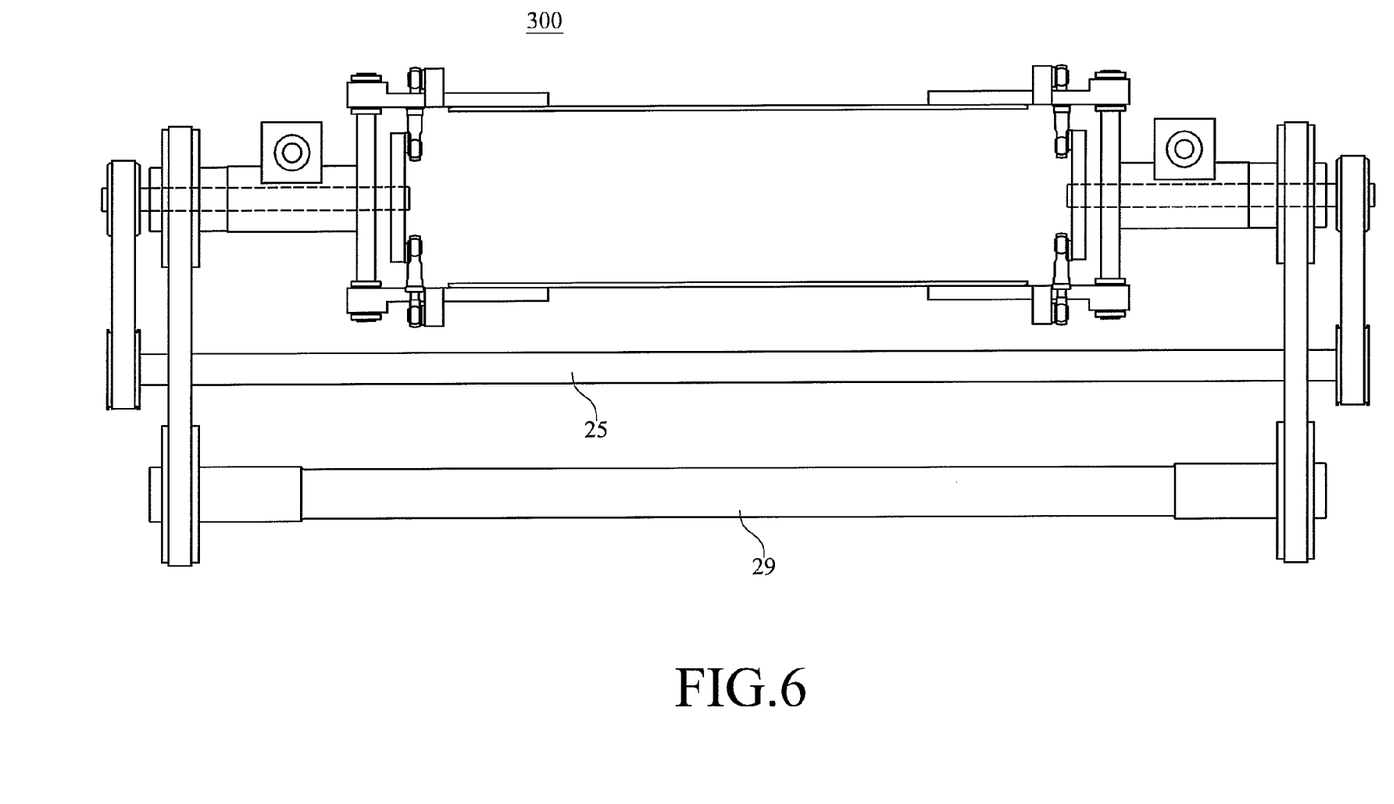
FIG. 6 is a schematic structural view of a device for clamping and rotating the object, in accordance with a fourth embodiment of the present invention.

Certainly, the third rod 25 can also be provided out of the fourth rod 29, as shown on FIG. 6, wherein the device 300 and device 30 are with the same functions also.

Although particular embodiments of the invention have been described in detail for purposes of illustration, various modifications and enhancements may be made without departing from the spirit and scope of the invention. Accordingly, the invention is not to be limited except as by the appended claims.

What is claimed is:
1. A device for clamping and rotating the object, comprising:
 a first plate;
 a second plate, placed in the opposite position of said first plate, wherein a clamping space is provided between said first plate and second plate;
 two linked units, each comprising a rotating unit and two connecting units, wherein said rotating unit is connected to said first plate and said second plate through said connecting units;
 two first rods, respectively connected to two said rotating units for driving said rotating units to rotate;

two second rods, respectively connected to two said rotating units for driving said first plate and second plate to rotate through said rotating units;

a third rod, connected to two said first rods; and a fourth rod, connected to two said second rods, wherein said second rod is connected to said rotating unit through a cylinder, which is used for driving said rotating unit to rotate.

2. The device for clamping and rotating the object as claimed in claim 1, wherein two said first rods are connected to said third rod through a first linked unit respectively, and two said second rods are connected to said fourth rod through a second linked unit respectively.

3. The device for clamping and rotating the object as claimed in claim 1, wherein said third rod is passed through a through hole provided within said fourth rod.

4. The device for clamping and rotating the object as claimed in claim 1, wherein two said first rods are connected to the rotation axles of two said rotating units respectively.

5. A device for clamping and rotating the object, comprising:

a first plate;

a second plate, placed in the opposite position of said first plate, wherein a clamping space is provided between said first plate and said second plate;

two linked units, each comprising a rotating unit and two connecting units, wherein said rotating unit is connected to said first plate and second plate through said connecting units;

two first rods, respectively connected to two said rotating units for driving said rotating units to rotate;

two second rods, respectively connected to said first plate and second plate for driving said first plate and second plate to rotate;

a third rod, connected to two said first rods; and a fourth rod, connected to two said second rods, wherein each of said second rods is connected to said first plate and second plate through at least one slide, and wherein a sliding seat is provided on each end of said first plate and second plate, wherein said first late and second late are connected to said slides through said sliding seats.

6. The device for clamping and rotating the object as claimed in claim 5, wherein said third rod is passed through a through hole provided within said fourth rod.

7. The device for clamping and rotating the object as claimed in claim 5, wherein two said first rods are connected to said third rod through a first linked unit respectively, and two said second rods are connected to said fourth rod through a second linked unit respectively.

8. The device for clamping and rotating the object as claimed in claim 5, wherein two said first rods are connected to the rotation axles of each of two said rotating units respectively.

9. A device for clamping and rotating the object, comprising:

a first plate;

a second plate, placed in the opposite position of said first plate, wherein a clamping space is provided between said first late and said second plate;

two linked units, each comprising a rotating unit and two connecting units, wherein said rotating unit is connected to said first plate and second plate through said connecting units;

two first rods, respectively connected to two said rotating units for driving said rotating units to rotate;

two second rods, respectively connected to said first plate and second plate for driving said first plate and second plate to rotate:

a third rod, connected to two said first rods;

a fourth rod, connected to two said second rods; and at least one cylinder used for driving said first rods or said rotating units to rotate.

* * * * *